United States Patent
Satou (10) Patent No.: US 8,160,496 B2
(45) Date of Patent: Apr. 17, 2012

(54) WIRELESS COMMUNICATION UNIT, MOBILE TERMINAL, AND WIRELESS AUTHENTICATION CONTROL METHOD

(75) Inventor: Yoshiyasu Satou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 251 days.

(21) Appl. No.: 12/664,760

(22) PCT Filed: Jun. 25, 2007

(86) PCT No.: PCT/JP2007/062729
§ 371 (c)(1),
(2), (4) Date: Dec. 15, 2009

(87) PCT Pub. No.: WO2009/001433
PCT Pub. Date: Dec. 31, 2008

(65) Prior Publication Data
US 2010/0144275 A1    Jun. 10, 2010

(51) Int. Cl.
*H04B 7/00* (2006.01)
(52) U.S. Cl. ....... 455/41.2; 455/410; 455/411; 455/450; 455/452.1; 455/452.2; 455/456.1; 455/456.2; 455/67.11; 455/67.13; 455/500; 455/507; 455/509
(58) Field of Classification Search .......... 455/410, 455/411, 435.1, 450, 451, 452.1, 452.2, 41.2, 455/500, 507, 509, 67.11, 67.13, 456.1, 456.2; 709/223–228; 370/329, 332, 335
See application file for complete search history.

(56) References Cited

U.S. PATENT DOCUMENTS

| | | | | |
|---|---|---|---|---|
| 6,535,494 B1 * | 3/2003 | Kondo et al. | | 370/335 |
| 7,110,747 B2 * | 9/2006 | Jain et al. | | 455/411 |
| 7,266,373 B2 * | 9/2007 | Aubauer et al. | | 455/435.1 |
| 7,460,863 B2 * | 12/2008 | Steelberg et al. | | 455/419 |
| 7,817,588 B2 * | 10/2010 | Jeon | | 370/310 |
| 8,027,666 B2 * | 9/2011 | Xie et al. | | 455/411 |
| 2005/0037734 A1 | 2/2005 | Tanaka et al. | | |
| 2007/0202807 A1 * | 8/2007 | Kim | | 455/41.2 |
| 2009/0232041 A1 * | 9/2009 | Smith | | 370/312 |

FOREIGN PATENT DOCUMENTS

| | | |
|---|---|---|
| JP | 2004-143806 A | 5/2004 |
| JP | 2005-005902 A | 1/2005 |
| JP | 2007-019879 A | 1/2007 |
| WO | 2007/037088 A1 | 4/2007 |

OTHER PUBLICATIONS

International Search Report for PCT/JP2007/062729, Dec. 2008.

* cited by examiner

*Primary Examiner* — Tuan A Tran
(74) *Attorney, Agent, or Firm* — Pearne & Gordon LLP (57) ABSTRACT

An object of the invention is to provide a wireless communication unit capable of suppressing interference of signal resend of one controlled device with reception of a signal transmitted from another controlled device to conduct wireless authentication with two or more controlled devices. In the wireless communication unit of the invention, a short-range wireless control section 162 controls to perform wireless authentication processing with a controlled device 2 using a radio wave at a different frequency depending on whether wireless authentication in an authentication mode with the controlled device 2 results in success or failure.

9 Claims, 7 Drawing Sheets

WIRELESS COMMUNICATION UNIT, MOBILE TERMINAL, AND WIRELESS AUTHENTICATION CONTROL METHOD

TECHNICAL FIELD

This invention relates to a wireless communication unit, a mobile terminal, and a wireless authentication control method for conducting wireless communications with a controlled device to be wirelessly authenticated.

BACKGROUND ART

In recent years, a controlled device including a wireless authentication function of unlocking if it is determined that the reception strength of a radio wave received from a wireless key (a wireless communication unit) is equal to or greater than a predetermined value and that authentication with the wireless key results in success based on a signal transmitted and received using the wireless communications; and locking if it is determined that the reception strength of a radio wave received from the wireless key is less than the predetermined value or that authentication with the wireless key results in failure has been proposed (for example, patent document 1). As an example of a controlled device put to practical use, an automobile for locking or unlocking a door key by conducting wireless authentication with a wireless key, a mobile telephone for rejecting or permitting acceptance with an operation key by conducting wireless authentication with a wireless key, or the like can be named.

Patent document 1: JP-A-2004-143806

DISCLOSURE OF THE INVENTION

Problems to be Solved by the Invention

Figure 6:
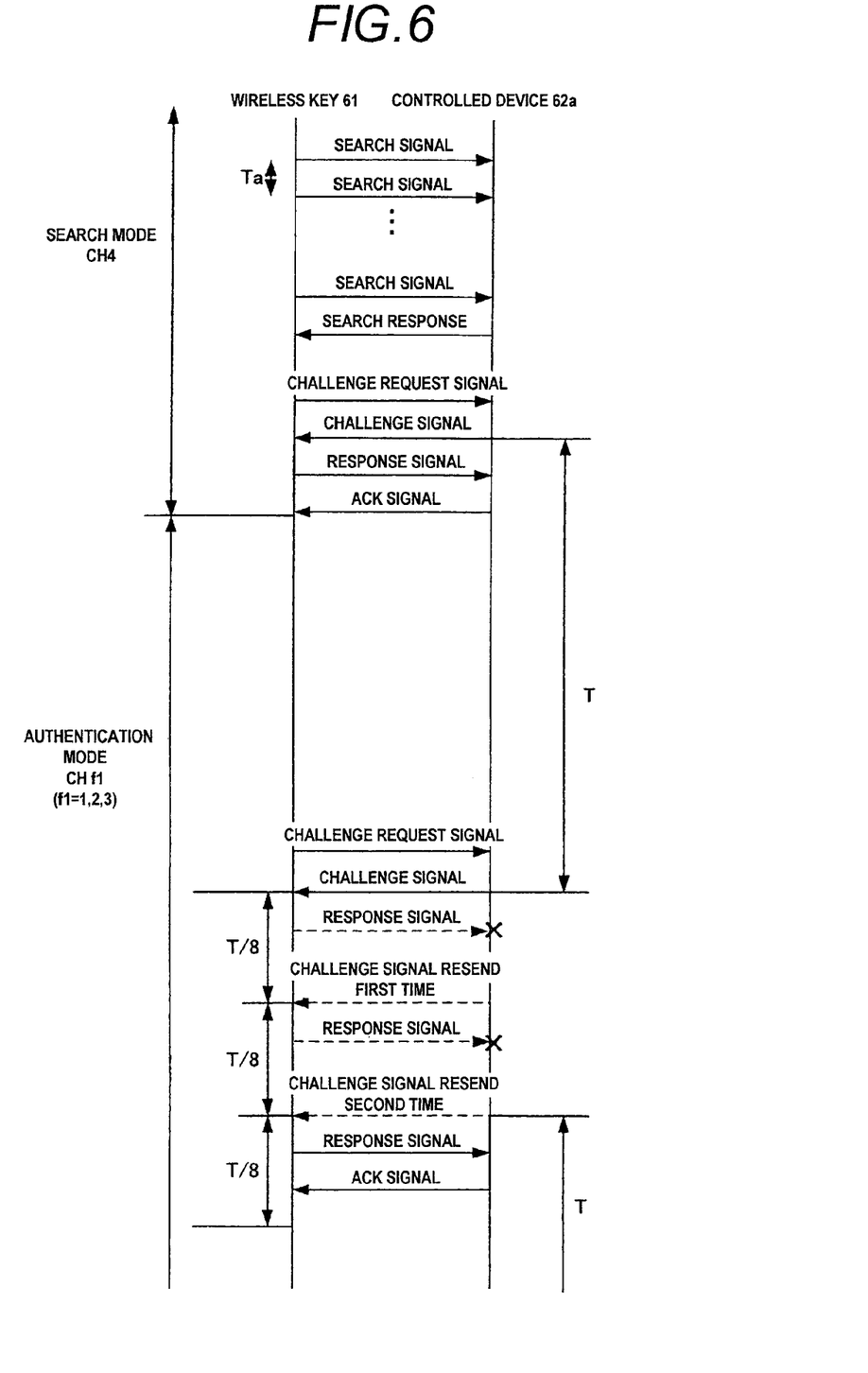
FIG. 6 shows a sequence at the authentication mode between a wireless key and a controlled device.

A sequence for realizing wireless authentication between a wireless key and a controlled device will be described. The sequence for realizing wireless authentication between a wireless key and a controlled device differs between a search mode in which the wireless key and the controlled device search for each other and an authentication mode for conducting authentication between the wireless key and the controlled device; here, the sequence in the authentication mode will be described. FIG. 6 shows a sequence at the authentication mode between a wireless key and a controlled device. A wireless key 61 starts counting the time with the point in time receiving a challenge signal (and a resent challenge signal described later) from a controlled device 62a as the start point; the controlled device 62a starts counting the time with the point in time transmitting a challenge signal (and a resent challenge signal described later) to the wireless key 61 as the start point, whereby the wireless key 61 and the controlled device 62a are synchronized with each other in the later sequence.

The wireless key 61 transmits and receives signals using a challenge and response system to and from the controlled device 62a in wireless authentication in the search mode. The wireless key 61 receiving a challenge signal from the controlled device 62a transmits a response signal to the controlled device 62a and then when receiving an ACK signal from the controlled device 62a, assumes that the authentication using the challenge and response system results in success.

When time T has elapsed since the point in time starting to count the time (the point in time transmitting the challenge signal to the wireless key 61), the controlled device 62a again transmits a challenge signal to the wireless key 61 and starts counting the time with the point in time transmitting the challenge signal to the wireless key 61 as the start point. The time interval T refers to the time period between the point in time at which the controlled device 62a transmits the previous challenge signal and the point in time at which the controlled device 62a transmits the subsequent challenge signal. If the wireless key 61 receives the challenge signal from the controlled device 62a, the wireless key 61 transmits a response signal generated by performing encryption processing for the challenge signal to the controlled device 62a and starts counting the time with the point in time receiving the challenge signal from the controlled device 62a as the start point.

If the controlled device 62a receives the response signal from the wireless key 61, the controlled device 62a transmits an ACK signal to the wireless key 61. On the other hand, if the controlled device 62a cannot receive a response signal from the wireless key 61 within a predetermined time interval (for example, within (T/8)), the controlled device 62a resends a challenge signal (challenge signal resend first time in FIG. 6) and again starts counting the time with the point in time resending the challenge signal to the wireless key 61 as the start point and waits for a response signal from the wireless key 61. If the controlled device 62a can receive the response signal from the wireless key 61 at the challenge signal resend first time, the controlled device 62a transmits an ACK signal to the wireless key 61. Then, when time T has elapsed since the point in time starting to count the time (the point in time transmitting the challenge signal resend first time to the wireless key 61), the controlled device 62a again transmits a challenge signal to the wireless key 61 and starts counting the time with the point in time transmitting the challenge signal to the wireless key 61 as the start point.

On the other hand, if the controlled device 62a cannot receive a response signal to the challenge signal resend first time from the wireless key 61 within the predetermined time interval (T/8), the controlled device 62a re-resends a challenge signal (challenge signal resend second time in FIG. 6) and again starts counting the time with the point in time re-resending the challenge signal to the wireless key 61 as the start point and waits for a response signal from the wireless key 61. If the controlled device 62a can receive the response signal from the wireless key 61 at the challenge signal resend second time, the controlled device 62a transmits an ACK signal to the wireless key 61. Then, when time T has elapsed since the point in time starting to count the time (the point in time transmitting the challenge signal resend second time to the wireless key 61), the controlled device 62a again transmits a challenge signal to the wireless key 61 and starts counting the time with the point in time transmitting the challenge signal to the wireless key 61 as the start point.

In the sequence described above, various signals are transmitted using a radio wave at one frequency (for example, CH4) in the time period of the search mode. It is considered that the controlled device 62a making a transition from the search mode to the authentication mode notifies the wireless key 61 of a frequency (for example, any one of CH1 to CH3) specified at random based on a random number generated when generating a challenge signal by the challenge signal. Thus, various signals are transmitted using a radio wave at the frequency (for example, any one of CH1 to CH3) of which the wireless key 61 is notified by the challenge signal in the time period of the authentication mode after the wireless key 61 receives the ACK signal and after the controlled device 62a transmits the ACK signal just after the transition to the authentication mode.

Figure 7:
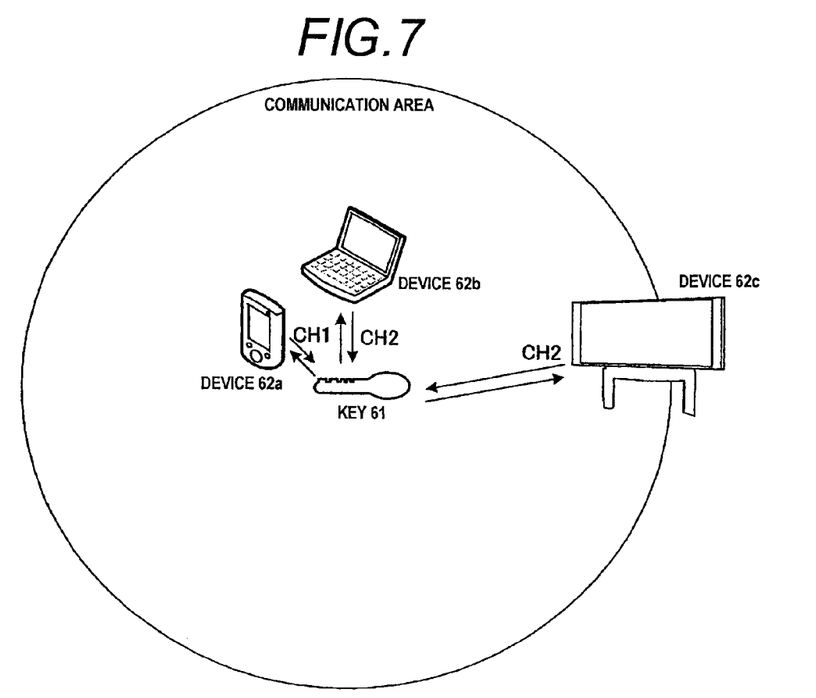
FIG. 7 shows the positional relationship between the wireless key and a plurality of controlled devices.
Figure 8:
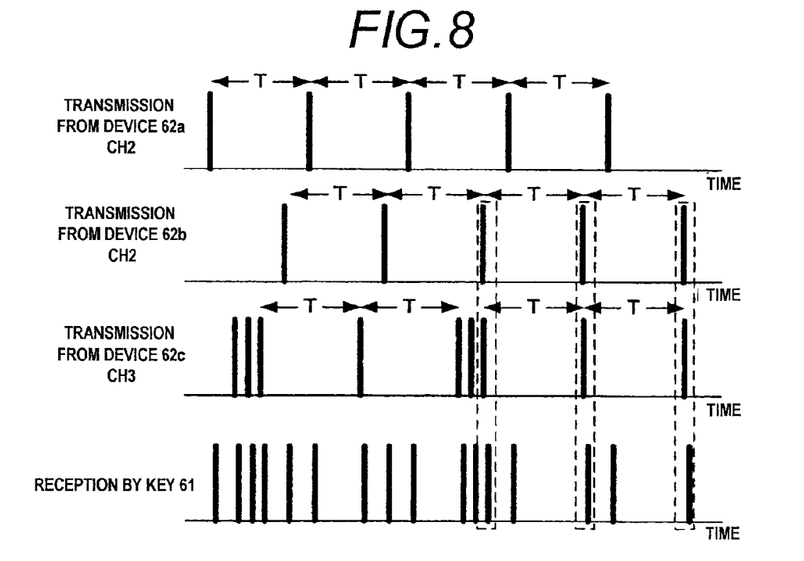
FIG. 8 is a time chart to represent timings at which the controlled devices transmit a challenge signal.

In the sequence described above, however, when the wireless key conducts wireless authentication according to the authentication mode with a plurality of controlled devices, the following problem arises: FIG. 7 shows the positional relationship between the wireless key and a plurality of controlled devices, and FIG. 8 is a time chart to represent timings at which the mobile terminal and the controlled devices transmit and receive a challenge signal. FIG. 7 shows the positional relationship when three controlled devices 62a, 62b, and 62c are positioned in a zone wherein they can conduct wireless communications with the wireless key 61 (the inside of a circle with the wireless key 61 as the center in FIG. 7, called communication area) and wireless authentication is conducted with one wireless key 61 in each. In FIG. 7, it is assumed that the controlled device 62a and the controlled device 62b are positioned at places near to the wireless key 61 (in the center vicinity of the circle indicated as the communication area in FIG. 7) and the controlled device 62c is positioned at a distant place from the wireless key 61 (in the vicinity of the circle indicated as the communication area in FIG. 7).

Occasions increase for the wireless key 61 to fail to receive a challenge signal from the controlled device 62c positioned at the distant place as compared with the controlled device 62a, 62b positioned at the near place or occasions increase for the controlled device 62c to fail to receive a response signal from the wireless key 61. Thus, occasions increase for the controlled device 62c to resend a challenge signal. Consequently, as shown in FIG. 8, the controlled device 62a or 62b transmits a challenge signal to the wireless key 61 in the period of the time T, but the controlled device 62c transmits a challenge signal to the wireless key 61 in the period with a delay as long as the time period required for resending a challenge signal to the wireless key 61 and thus the wireless key 61 receives the challenge signals transmitted from the controlled device 62b and the controlled device 62c at the same time (in FIG. 8, the wireless key 61 receives the challenge signals at the same time at the point in time surrounded by the dotted line.) and there is a possibility that wireless authentication with either the controlled device 62b or the controlled device 62c or wireless authentication with both may result in failure. Particularly, in the configuration wherein the a radio frequency (any of CH1, CH2, or CH3) used for wireless authentication during the authentication mode is set at random, the radio frequency (any of CH1, CH2, or CH3) may become the same in the controlled device 62b positioned at the place near to the wireless key 61 and the controlled device 62c positioned at the distant place, in which case the possibility that wireless authentication with both the controlled device 62b or the controlled device 62c may result in failure increases.

In view of the circumstances described above, it is an object of the invention to provide a wireless communication unit, a mobile terminal, and a wireless authentication control method capable of suppressing interference of signal resend of one controlled device with reception of a signal transmitted from another controlled device to conduct wireless authentication with two or more controlled devices.

Means for Solving the Problems

A wireless communication unit of the invention is a wireless communication unit that includes: a short-range wireless transmission-reception section which transmits and receives a radio wave used for wireless communications; and a short-range wireless control section which controls wireless authentication processing with a controlled device, wherein the short-range wireless control section controls to perform the wireless authentication processing with the controlled device using a radio wave at a different frequency depending on whether wireless authentication in an authentication mode with the controlled device results in success or failure.

A mobile terminal of the invention includes the wireless communication unit of the invention.

A wireless authentication control method of the invention is a wireless authentication control method of controlling wireless authentication processing with a controlled device by a wireless communication unit, the wireless authentication control method including the steps of: determining whether wireless authentication in an authentication mode with the controlled device results in success or failure; assigning different radio frequencies to the controlled device succeeding in the wireless authentication and to the controlled device failing the wireless authentication, respectively; and performing wireless authentication processing with the controlled device using a radio wave at the assigned radio frequency.

The wireless communication unit of the invention includes a wireless communication unit wherein the short-range wireless control section determines whether the wireless authentication in the authentication mode with the controlled device results in success or failure based on the reception strength of a radio wave received from the controlled device.

The wireless communication unit of the invention includes a wireless communication unit wherein the short-range wireless control section determines whether the wireless authentication in the authentication mode with the controlled device results in success or failure in response to whether or not the reception strength of the radio wave received from the controlled device is equal to or greater than a threshold value.

The wireless communication unit of the invention includes a wireless communication unit wherein the short-range wireless control section determines whether the wireless authentication in the authentication mode with the controlled device results in success or failure in response to whether or not the time period over which the reception strength of the radio wave received from the controlled device is equal to or greater than a threshold value, is equal to or greater than a predetermined time period.

The wireless communication unit of the invention includes a wireless communication unit wherein the short-range wireless control section determines whether the wireless authentication in the authentication mode with the controlled device results in success or failure based on a signal received from the controlled device for notifying the wireless communication unit of success or failure in wireless authentication with the wireless communication unit.

The wireless communication unit of the invention includes a wireless communication unit wherein if the wireless authentication in the authentication mode with the controlled device results in failure, the short-range wireless control section causes the short-range wireless transmission-reception section to transmit a signal for limiting the number of times the controlled device resends a signal to the wireless communication unit.

The wireless communication unit of the invention includes a wireless communication unit wherein if the wireless authentication in the authentication mode with a predetermined number of the controlled devices or more results in success, the short-range wireless control section causes the short-range wireless transmission-reception section to transmit a signal for limiting the number of times each controlled device resends a signal to the wireless communication unit.

According to the configuration, to conduct wireless authentication with two or more controlled devices, interference of signal resend of one controlled device with reception of a signal transmitted from another controlled device can be suppressed.

Advantageous Effects of the Invention

According to the wireless communication unit, the mobile terminal, and the wireless authentication control method of the invention, to conduct wireless authentication with two or more controlled devices, interference of signal resend of one controlled device with reception of a signal transmitted from another controlled device can be suppressed.

DESCRIPTION OF REFERENCE NUMERALS 1, 61 Mobile terminal
11 Cellular transmission-reception section
12 Notification section
13 Microphone
14 Operation input section
15 Mobile terminal control section
16 Wireless communication unit
161 Short-range wireless transmission-reception section
162 Short-range wireless control section
163 Authentication ID storage section
2, 62 Controlled device
21 Wireless communication unit
22 Unique function control section
23 Unique function drive section
211 Short-range wireless transmission-reception section
212 Short-range wireless control section
213 Authentication ID storage section
3 Master key
311 Short-range wireless transmission-reception section
312 Short-range wireless control section
313 Authentication ID storage section

BEST MODE FOR CARRYING OUT THE INVENTION

Figure 1:
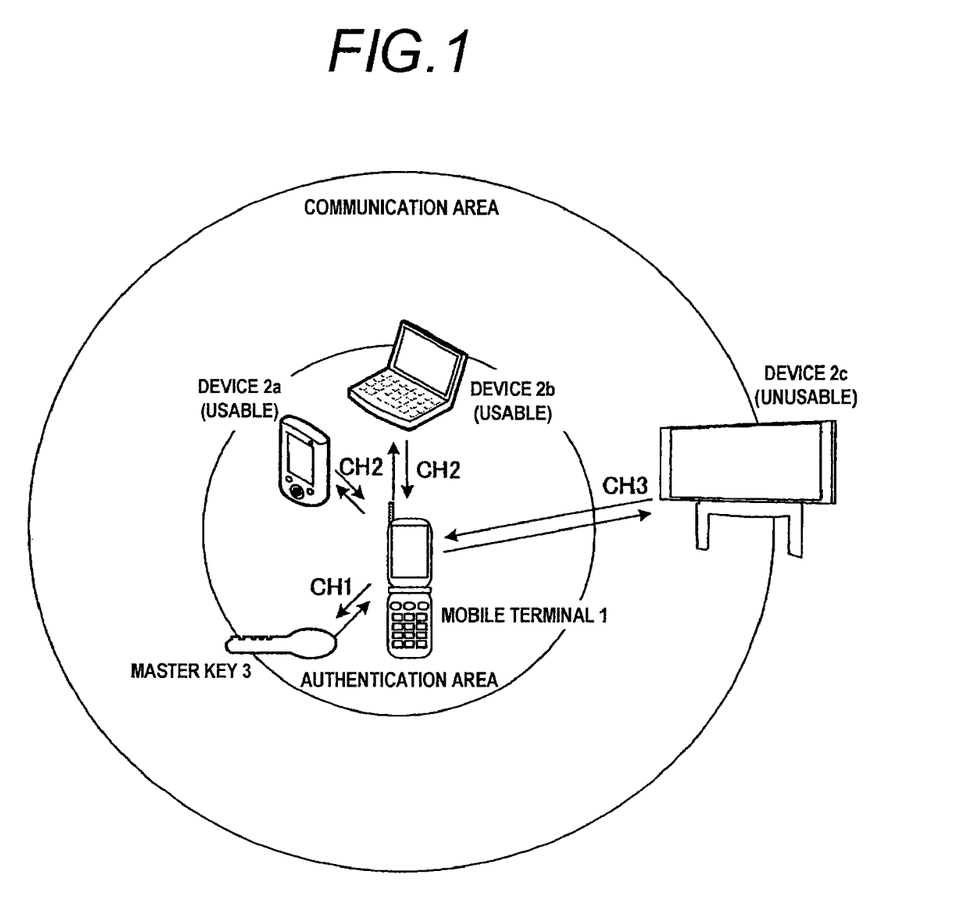
FIG. 1 shows an example of the positional relationship between a mobile terminal and a plurality of controlled devices and radio frequencies set for the controlled devices according to an embodiment of the invention.

A mobile terminal according to an embodiment of the invention will be described below. First, processing of a wireless authentication system including a mobile terminal 1 and controlled devices 2a, 2b, and 2c will be described. FIG. 1 shows an example of the positional relationship between the mobile terminal and the controlled devices and radio frequencies set for the controlled devices according to the embodiment of the invention. In FIG. 1, it is assumed that the mobile terminal 1 includes a wireless communication unit for conducting wireless authentication with each of the controlled devices 2a, 2b, and 2c, and the wireless communication unit conducts wireless authentication with each paired controlled device 2a, 2b, 2c.

The mobile terminal 1 and the controlled devices 2a, 2b, and 2c execute processing roughly classified into two types. One is processing of authenticating the associated device by transmitting and receiving a signal conforming to an authentication protocol (authentication processing) and the other is processing of measuring the reception strength of a radio wave received from the associated device and determining the magnitude of the reception strength (reception strength determination processing). In the embodiment, the authentication processing and the reception strength determination processing are collectively called wireless authentication.

As shown in FIG. 1, a circle called authentication area with the mobile terminal 1 as the center (the inner circle of two circles in FIG. 1) indicates a boundary wherein when the mobile terminal 1 receives a radio wave from a controlled device positioned within the circle, the reception strength becomes a predetermined value or more, whereas when the mobile terminal 1 receives a radio wave from a controlled device positioned outside the circle, the reception strength becomes less than the predetermined value. If the controlled device 2a, 2b, 2c fails authentication with the mobile terminal 1 or if the reception strength of a radio wave received from the mobile terminal 1 is less than the predetermined value (namely, the controlled device is positioned outside the authentication area), at least a part of the functions of the controlled device 2a is limited. In FIG. 1, the controlled device 2c positioned outside the authentication area is in a state in which limitation is imposed on at least a part of the functions (unusable).

On the other hand, if the controlled device 2a succeeds in authentication with the mobile terminal 1 and if the reception strength of a radio wave received from the mobile terminal 1 is the predetermined value or more (namely, the controlled device is positioned within the authentication area), the limitation imposed on the function of the controlled device 2a is canceled. In FIG. 1, the controlled devices 2a and 2b positioned within the authentication area is in a state in which the limitation is canceled (usable).

The inside of a circle called communication area (the outer circle of the two circles in FIG. 1) is the range in which the mobile terminal 1 can conduct wireless communications with a controlled device positioned within the circle. The mobile terminal 1 performs authentication processing with the controlled device positioned inside the communication area. On the other hand, the mobile terminal 1 cannot conduct wireless communications with a controlled device positioned outside the communication area and thus cannot conduct authentication processing.

According to the wireless authentication system including the mobile terminal and the controlled devices, if the mobile terminal set in a pair with each controlled device does not exist in the predetermined range, the controlled device enters a state in which limitation is imposed and thus use of the controlled device by a third person is limited (prohibited). When the controlled device set in a pair with the mobile terminal moves from within the predetermined range to the outside of the range, etc., the mobile terminal outputs a warning sound, whereby leaving the controlled device and stealing the controlled device can be prevented.

Further, the mobile terminal according to the embodiment of the invention assigns different use frequencies (for example, CH1, CH2, CH3) to the controlled device succeeding in wireless authentication and the controlled device failing wireless authentication respectively, of the controlled devices in the authentication mode. This means that the mobile terminal according to the embodiment of the invention assigns different use frequencies to the controlled device determined a threshold value or more according to the reception strength determination processing (namely, the controlled device positioned within the authentication area) and the controlled device determined less than the threshold value (namely, the controlled device positioned outside the authentication area), of the controlled devices positioned in the communication area and performing authentication processing in the authentication mode with the mobile terminal. In FIG. 1, the use frequency CH2 is assigned to the controlled device 2a and the controlled device 2b positioned within the authentication area and the use frequency CH3 is assigned to the controlled device 2c positioned outside the authentication area.

The different use frequencies are assigned to the controlled devices 2a and 2b succeeding in wireless authentication and the controlled device 2c failing wireless authentication respectively, of the controlled devices 2a, 2b, and 2c in the authentication mode, whereby the mobile terminal 1 makes it possible to selectively skip reception of a signal from the controlled device 2c involving a high possibility of resending a signal to the mobile terminal 1. Consequently, interference of signal resend of the controlled device 2c with reception of a signal transmitted from the controlled device 2a, 2b can be suppressed and the wireless authentication with the unlimited devices 2a and 2b succeeding in wireless authentication can be executed preferentially.

In FIG. 1, the mobile terminal 1 also conducts wireless authentication with a master key 3. If the mobile terminal 1 fails the wireless authentication with the master key 3, limitation is imposed on at least a part of the functions of the mobile terminal 1. For example, limitation is imposed so that the mobile terminal 1 executes wireless authentication with the controlled devices 2a, 2b, and 2c during the time period over which the mobile terminal 1 succeeds in the wireless authentication with the master key 3; on the other hand, does not execute during the time period over which the mobile terminal 1 fails the wireless authentication.

Figure 2:
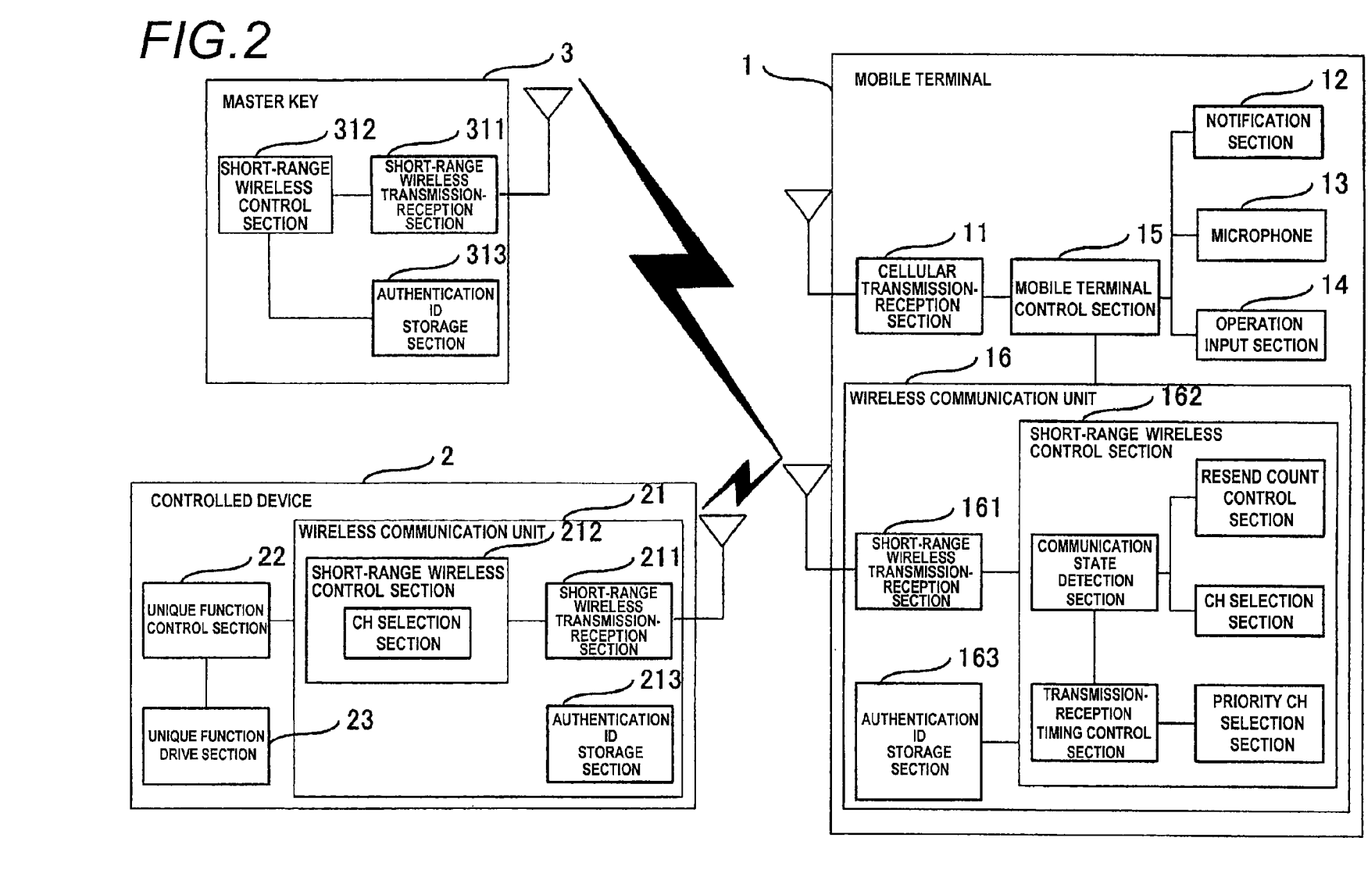
FIG. 2 is a function block diagram of the mobile terminal, the controlled device, and a master key according to an embodiment of the invention.

The wireless authentication by the mobile terminal according to the embodiment of the invention will be described below in detail. FIG. 2 is a function block diagram of the mobile terminal according to the embodiment of the invention, the controlled device, and the master key.

The mobile terminal 1 according to the embodiment of the invention includes a cellular transmission-reception section 11, a notification section 12, a microphone 13, an operation input section 14, a mobile terminal control section 15, and a wireless communication unit 16. Further, the wireless communication unit 16 includes a short-range wireless transmission-reception section 161, a short-range wireless control section 162, and an authentication ID storage section 163.

The cellular transmission-reception section 11 detects and amplifies a voltage generated in an antenna and outputs the voltage value to the mobile terminal control section 15 as an electric signal. The cellular transmission-reception section 11 also feeds the electric signal input from the mobile terminal control section 15 to the antenna for sending a radio wave. As the antenna, for example, various antennas used with recent mobile telephones can be applied.

The mobile terminal control section 15 demodulates the electric signal input from the cellular transmission-reception section 11 conforming to a predetermined communication system decided between the mobile terminal 1 and a wireless base station and further performs decoding and acquires digital data or encrypts the digital data and further outputs a modulated electric signal to the cellular transmission-reception section 11. As the predetermined communication system, a PDC (Personal Digital Cellular) system, a GSM (Global System for Mobile Communication) system, a system standardized according to IMT (International Mobile Telecommunications)-200, or the like is possible. Further, the mobile terminal control section 15 outputs an output control signal to the notification section 12 implemented as a speaker, an LED, a liquid crystal display, or the like and controls information output of the notification section 12. The mobile terminal control section 15 also acquires digital data into which a sound signal input from the microphone 13 is converted. The mobile terminal control section 15 also executes various types of processing based on an input signal input from the operation input section 14 for accepting input operation of the mobile terminal user. The mobile terminal control section 15 also imposes limitation on execution of each of the various functions that can be executed by the mobile terminal 1 in response to the result of the wireless authentication with the master key 3 sent from the wireless communication unit 16.

The wireless communication unit 16 includes the short-range wireless transmission-reception section 161, the short-range wireless control section 162, and the authentication ID storage section 163. The short-range wireless transmission-reception section 161 transmits and receives a signal through a radio wave for short-range communications used with 400-MHz band specified low power radio, RFID (Radio Frequency Identification), a radio wave of UWB (Ultra Wide Band), etc., through the antenna. The short-range wireless control section 162 controls signal transmission and reception of the short-range wireless transmission-reception section 161 based on a predetermined communication protocol. The control of signal transmission and reception performed by the short-range wireless control section 162 will be described below with reference to a sequence and a flowchart. The short-range wireless control section 162 includes circuits of an amplification circuit, a modulation circuit, a demodulation circuit, an encode circuit, a decode circuit, etc. The short-range wireless control section 162 measures the reception strength of a radio wave used with wireless communications (for example, calculated based on the voltage level and the S/N ratio of a radio wave input to the demodulation circuit, the error rate of data decoded by the decode circuit, etc.,) and also determines whether the reception strength is equal to or greater than or is less than a preset threshold value (numeric value for classifying the area into an authentication area or a communication area). The authentication ID storage section 163 stores the identification ID unique to the controlled device 2 and the identification ID unique to the mobile terminal 1 paired previously with the wireless communication unit 16; to transmit and receive a signal to and from the controlled device 2, the short-range wireless control section 162 references the identification ID and advances authentication with the paired controlled device 2.

The controlled device 2 includes a wireless communication unit 21, a unique function control section 22, and a unique function drive section 23. The wireless communication unit 21 includes a short-range wireless transmission-reception section 211, a short-range wireless control section 212, and an authentication ID storage section 213. The short-range wireless transmission-reception section 211 transmits and receives a signal through a radio wave for short-range communications used with 400-MHz band specified low power radio, RFID (Radio Frequency Identification), a radio wave of UWB (Ultra Wide Band), etc., through the antenna. The short-range wireless control section 212 controls signal transmission and reception of the short-range wireless transmission-reception section 211 based on a predetermined communication protocol. The control of signal transmission and reception performed by the short-range wireless control section 212 will be described below with reference to a sequence and a flowchart. The short-range wireless control section 212 includes circuits of an amplification circuit, a modulation circuit, a demodulation circuit, an encode circuit, a decode circuit, etc. The short-range wireless control section 212 measures the reception strength of a radio wave used with wireless communications (for example, calculated based on the voltage level and the S/N ratio of a radio wave input to the demodulation circuit, the error rate of data decoded by the decode circuit, etc.,) and also determines whether the reception strength is equal to or greater than or is less than a preset threshold value (numeric value for classifying the area into an authentication area or a communication area). The authentication ID storage section 213 stores the identification ID unique to the mobile terminal 1 and the identification ID unique to the controlled device 2 paired previously with the wireless communication unit 21; to transmit and receive a signal to and from the mobile terminal 1, the short-range wireless control section 212 references the identification ID and advances authentication with the paired mobile terminal 1.

The unique function control section 22 imposes limitation on execution of each of various functions driven by the unique function drive section 23 in response to the result of the wireless authentication with the mobile terminal 1 sent from the wireless communication unit 21.

The master key 3 includes a short-range wireless transmission-reception section 311, a short-range wireless control section 312, and an authentication ID storage section 313. The short-range wireless transmission-reception section 311 transmits and receives a signal through a radio wave for short-range communications used with 400-MHz band specified low power radio, RFID (Radio Frequency Identification), a radio wave of UWB (Ultra Wide Band), etc., through the antenna. The short-range wireless control section 312 controls signal transmission and reception of the short-range wireless transmission-reception section 311 based on a predetermined communication protocol. The control of signal transmission and reception performed by the short-range wireless control section 312 is similar to that of signal transmission and reception performed by the short-range wireless control section 212 in the wireless communication unit 21 of the controlled device 2. The short-range wireless control section 312 includes circuits of an amplification circuit, a modulation circuit, a demodulation circuit, an encode circuit, a decode circuit, etc. The short-range wireless control section 312 measures the reception strength of a radio wave used with wireless communications (for example, calculated based on the voltage level and the S/N ratio of a radio wave input to the demodulation circuit, the error rate of data decoded by the decode circuit, etc.,) and also determines whether the reception strength is equal to or greater than or is less than a preset threshold value (numeric value for classifying the area into an authentication area or a communication area). The authentication ID storage section 313 stores the identification ID unique to the mobile terminal 1 and the identification ID unique to the master key 3 paired previously; to transmit and receive a signal to and from the mobile terminal 1, the short-range wireless control section 312 references the identification ID and advances authentication with the paired mobile terminal 1.

Figure 3:
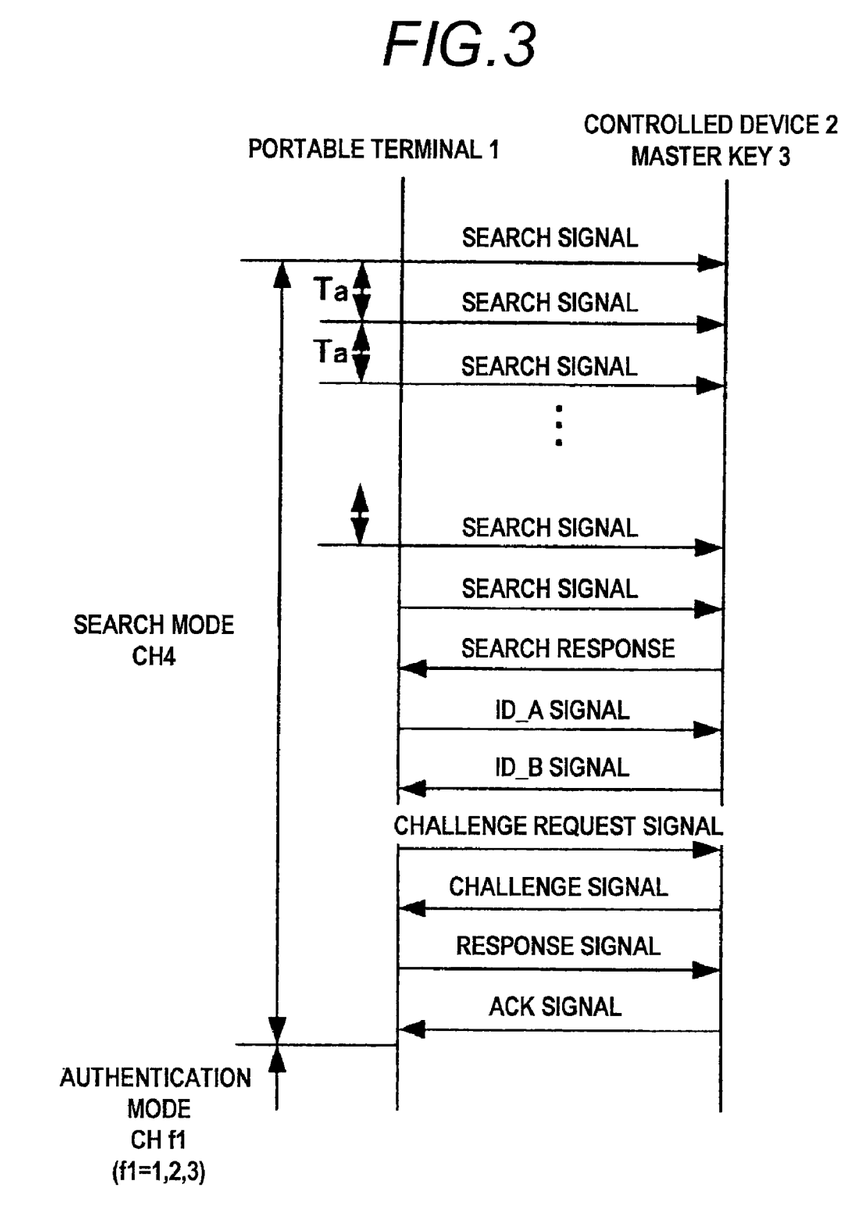
FIG. 3 shows a sequence at the search mode between the mobile terminal and the controlled device and between the mobile terminal and the master key according to an embodiment of the invention.

Next, wireless authentication of the mobile terminal according to the embodiment of the invention and each controlled device will be described. FIG. 3 shows a sequence in the search mode between the mobile terminal and the controlled device and between the mobile terminal and the master key according to the embodiment of the invention. Here, the sequence in the search mode between the mobile terminal and the controlled device will be described. The mobile terminal 1 continues to transmit a search signal at regular intervals in a period Ta and continues to transmit a search signal until reception of a search response transmitted from the controlled device 2 receiving the search signal. The controlled device 2 stands by to receive a search signal transmitted from the mobile terminal 1. When the controlled device 2 is positioned in a communication area where the controlled device 2 cannot receive a search signal transmitted from the mobile terminal 1, the controlled device 2 cannot receive a search signal from the mobile terminal 1 and therefore the mobile terminal 1 does not receive a search response from the controlled device and continues to transmit a search signal at regular intervals in the period Ta. The controlled device 2 stands by to receive a search signal transmitted from the mobile terminal 1.

Then, when the mobile terminal 1 or the controlled device 2 moves and the controlled device 2 moves to the authentication area, the controlled device 2 receives a search signal from the mobile terminal 1 and transmits a search response to the mobile terminal 1. The mobile terminal 1 receiving the search response transmits an ID_A signal containing an identification code for identifying the own device (mobile terminal 1) to the controlled device 2. The controlled device 2 receiving the ID_A signal determines whether or not the identification code contained in the ID_A signal matches identification code previously stored in the own device (controlled device 2) as data (the identification code is the identification code of the mobile terminal paired with the controlled device for conducting wireless authentication). If the identification codes match each other, the controlled device 2 transmits an ID_B signal containing an identification code for identifying the own device (controlled device 2) to the mobile terminal 1.

The mobile terminal 1 receiving the ID_B signal then transmits and receives a signal to and from the controlled device 2 using the challenge and response system. That is, the mobile terminal 1 receiving the ID_B signal transmits a challenge request signal to the controlled device 2. The controlled device 2 receiving the challenge request signal transmits a challenge signal generated by generating a random number to the mobile terminal 1. The mobile terminal 1 receiving the challenge signal transmits a response signal generated by performing encryption processing for the challenge signal to the controlled device 2. The controlled device 2 receiving the response signal decrypts encryption of the response signal and determines whether or not the generated signal matches the challenge signal generated by the own device (controlled device 2); if the signal matches the challenge signal, the controlled device 2 determines that authentication with the mobile terminal 1 results in success, and transmits an ACK signal indicating authentication success to the mobile terminal 1.

If the mobile terminal 1 cannot receive any signals after the ID_A signal for a predetermined time from the associated device, the mobile terminal 1 again starts transmitting a search signal; and the controlled device 2 again starts to stand by to receive a search signal transmitted from the mobile terminal 1. In the sequence described above, the time period between the instant at which the mobile terminal 1 starts transmitting a search signal and the instant at which the controlled device 2 transmits a challenge signal (or the mobile terminal 1 receives a challenge signal) may be called search mode (the time period between the instant at which the mobile terminal 1 starts transmitting a search signal and the instant at which the mobile terminal 1 receives an ID_B signal may be called search mode and the time period between the instant at which the mobile terminal 1 transmits a challenge request signal and the instant at which the mobile terminal 1 receives an ACK signal may be called initial authentication mode).

Figure 4:
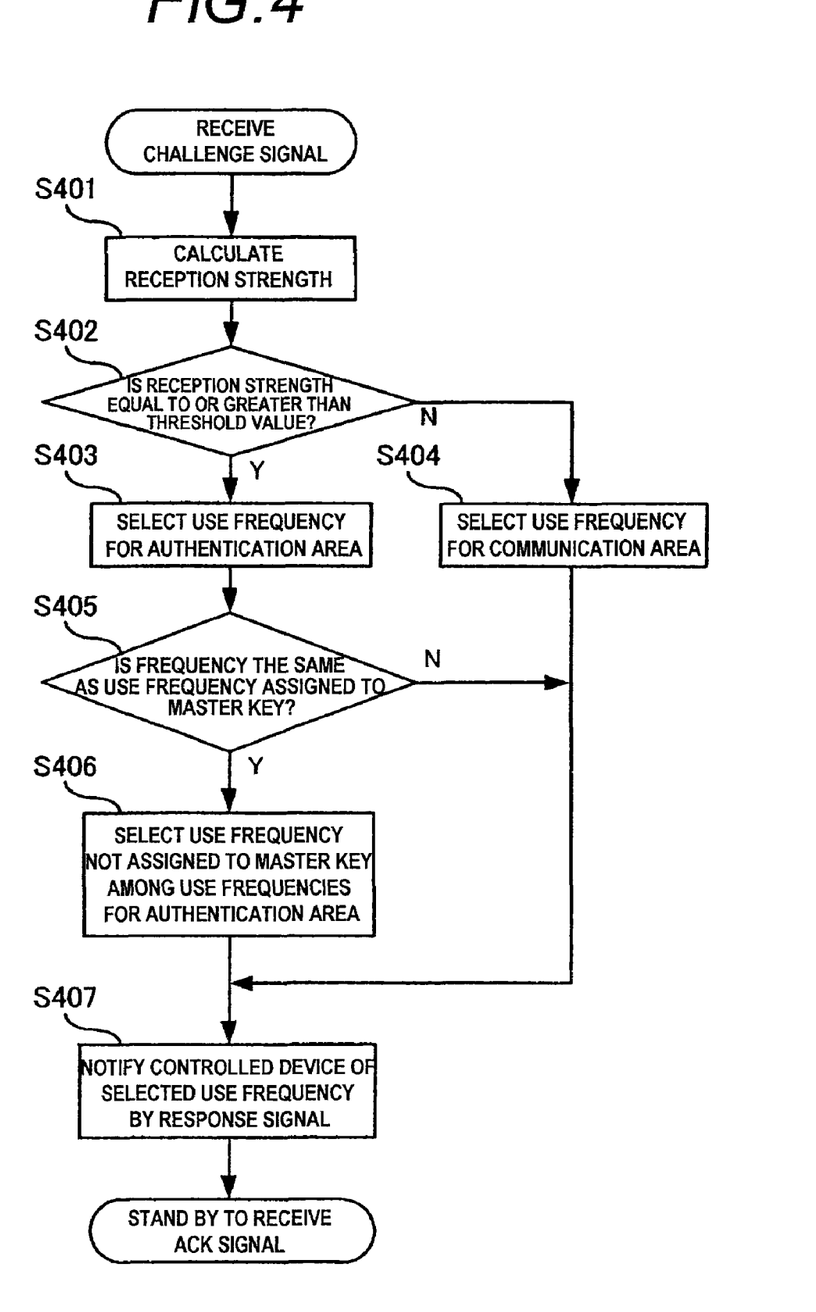
FIG. 4 is a flowchart to represent processing at the challenge signal receiving time by the mobile terminal according to the embodiment of the invention.

In the sequence described above, in the time period of the search mode, various signals are transmitted using a radio wave at a frequency (for example, CH4). Upon reception of a challenge signal from the controlled device 2, the mobile terminal according to the embodiment of the invention executes processing described below, determines the use frequency used for wireless authentication with the controlled device 2 in the time period of the authentication mode, and notifies the controlled device 2 of the determined use frequency. FIG. 4 is a flowchart to represent processing at the challenge signal receiving by the mobile terminal according to the embodiment of the invention.

That is, upon reception of a challenge signal from the controlled device 2, the mobile terminal 1 calculates the reception strength of the radio wave transmitting the challenge signal (step 401). The mobile terminal 1 executes reception strength determination processing and determines whether the calculated reception strength is equal to or greater than or is less than a threshold value (step 402, namely, determines whether the controlled device 2 is positioned inside or outside the authentication area. A communication state detection section shown in FIG. 2 executes steps 401 and 402). If the mobile terminal 1 determines that the calculated reception strength is equal to or greater than the threshold value (step 402, Y), the mobile terminal selects the use frequency (here, CH1 or CH2) to be assigned to the controlled device positioned in the authentication area (step 403); whereas if the mobile terminal 1 determines that the calculated reception strength is less than the threshold value (step 402, N), the mobile terminal selects the use frequency (in FIG. 1, CH3) to be assigned to the controlled device positioned in the communication area outside the authentication area (step 404).

It is assumed that the mobile terminal 1 also conducting wireless authentication with the master key 3 already conducts wireless authentication according to the authentication mode with the master key 3 positioned in the authentication area before starting wireless authentication with the controlled device 2. Thus, the mobile terminal 1 determines whether or not the use frequency assigned to the controlled device positioned in the authentication area at step 403 (here, CH1 or CH2) is the same frequency as the use frequency assigned to the master key 3 (in FIG. 1, CH1) (step 405). If the mobile terminal 1 determines that the use frequency is the same frequency (step 405, Y), the mobile terminal selects the use frequency (CH2) not assigned to the master key 3 among the use frequencies to be assigned to the controlled devices positioned in the authentication area (step 406). On the other hand, if the mobile terminal 1 determines that the use frequency is not the same frequency (step 405, N), the mobile terminal does not change the use frequency selected at step 403.

The mobile terminal 1 notifies the controlled device 2 of the use frequency thus selected at step 403, 404, 406 (a CH selection section shown in FIG. 2 executes the steps 403, 404, and 406) by a response signal (step 407). The mobile terminal 1 transmits and receives a signal after receiving an ACK signal from the controlled device 2 according to the selected use frequency. The controlled device 2 also transmits and receives a signal after transmitting an ACK signal according to the selected use frequency.

When receiving the challenge signal, the mobile terminal 1 determines the use frequency to be assigned to the controlled device 2 and notifies the controlled device 2 of the use frequency in accordance with the flowchart of FIG. 4. Here, the case where the mobile terminal 1 makes determination at step 402 in the flowchart of FIG. 4 for the challenge signal received from the controlled device 2 at the transition from the search mode to the authentication mode (namely, challenge signal in initial authentication mode), but may make the determination for the challenge signal received from the controlled device 2 during the time period of the authentication mode (or challenge signal resend first time, challenge signal resend second time).

Figure 5:
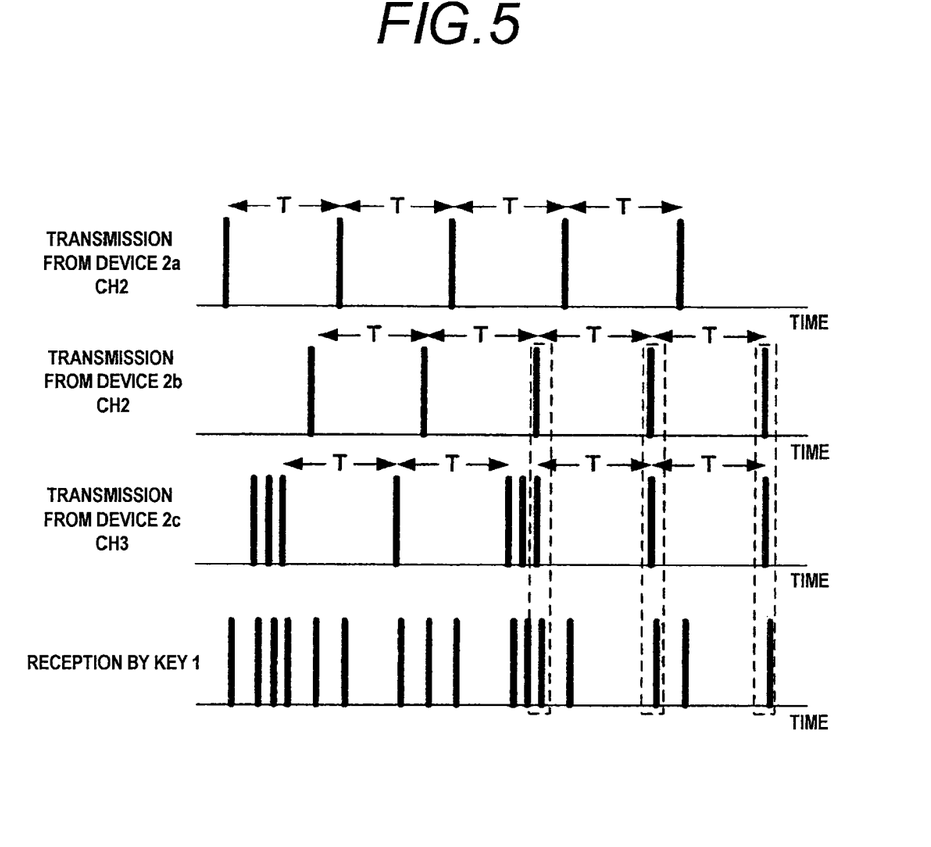
FIG. 5 is a time chart to represent timings at which the controlled devices transmit a challenge signal.

As described with reference to the sequence in FIG. 6, the mobile terminal 1 starting to count the time whenever receiving the challenge signal and the resent challenge signal can determine which timing the next challenge signal is to be transmitted at from the controlled device 2 (a transmission-reception timing control section shown in FIG. 2 determines the timing at which each controlled device 2 transmits a challenge signal). The mobile terminal 1 monitors the timing at which the controlled device 2a, 2b transmits a challenge signal and the timing at which the controlled device 2c transmits a challenge signal during the time period over which the mobile terminal 1 conducts wireless authentication according to the authentication mode with the controlled devices 2a and 2b positioned in the authentication area and the controlled device 2c positioned in the communication area; if the timings match at the point in time surrounded by the dotted line shown in FIG. 5 (or if the timing at which the controlled device 2a, 2b transmits a challenge signal is contained in the time period required for the controlled device 2c to resend a challenge signal more than once), the mobile terminal 1 receives the challenge signal transmitted by a radio wave at the use frequency (CH2) assigned to the controlled device 2a, 2b (a priority CH selection section shown in FIG. 2 selects the use frequency to which a priority is to be given if the timings at which the controlled devices 2 transmit a challenge signal match).

As the use environment of the wireless authentication system, for the user, it is considered that maintaining of authentication with the controlled devices 2a and 2b positioned in the authentication area is preferred to maintaining of authentication with the controlled device 2c positioned in the communication area. Thus, if the timing of receiving a challenge signal from the controlled device positioned in the authentication area and that from the controlled device positioned in the communication area match, the mobile terminal 1 preferentially receives a challenge signal from the controlled device positioned in the authentication area and maintains the success state in authentication with the controlled device positioned in the authentication area.

Further, to prevent the timing at which the controlled device 2a, 2b transmits a challenge signal from being contained in the time period required for the controlled device 2c to resend a challenge signal more than once, preferably the time period required for the controlled device 2c to resend a challenge signal is shortened. Thus, when notifying the controlled device 2 of the selected use frequency by a response signal, preferably the mobile terminal 1 also sends information for limiting the number of resend times of a signal by the controlled device 2 (number of resend permissions). Since the possibility of overlapping the timing at which the controlled device positioned in the communication area transmits a challenge signal is high as the number of controlled devices positioned in the authentication area or the number of controlled devices positioned in the communication area increases, the mobile terminal 1 may send the number of resend permissions increased or decreased in response to the number of controlled devices positioned in the authentication area or the communication area.

As described above, according to the mobile terminal according to the embodiment of the invention, different use frequencies are assigned to the controlled device succeeding in wireless authentication and the controlled device failing wireless authentication, of the controlled devices in the authentication mode, whereby to conduct wireless authentication with two or more controlled devices, interference of signal resend of one controlled device with reception of a signal transmitted from another controlled device can be suppressed.

In the embodiment of the invention, the configuration wherein the mobile terminal sets the use frequency to be assigned to a controlled device in response to the magnitude of the reception strength of a signal received from the controlled device has been described, but the embodiment is not limited to it. For example, a configuration is considered wherein if the reception strength of a signal received by the mobile terminal from the controlled device is equal to or greater than a threshold value and the time period over which the reception strength is equal to or greater than the threshold value exceeds a predetermined time, the mobile terminal assumes that the controlled device is in the authentication area, and assigns the use frequency for the authentication area; whereas if the reception strength of a signal received from the controlled device is less than the threshold value or the time period over which the reception strength is equal to or greater than the threshold value is less than the predetermined time, the mobile terminal assumes that the controlled device is in the communication area, and assigns the use frequency for the communication area. In the configuration, to determine whether the time period over which the reception strength is equal to or greater than the threshold value exceeds or falls below the predetermined time, the mobile terminal makes the determination according to whether or not the number of times a challenge signal received from the controlled device is equal to or greater than the threshold value is a predetermined number of times. According to the configuration, if the reception strength of the received radio wave changes steeply, the mobile terminal can be prevented from imprudently assuming that the controlled device is positioned in the authentication area where maintaining of the authentication success state is demanded.

In the embodiment of the invention, the configuration wherein the mobile terminal determines whether the controlled device is positioned in the authentication area or is positioned in the communication area has been described, but a configuration wherein the controlled device itself determines whether the controlled device is positioned in the authentication area or is positioned in the communication area and notifies the mobile terminal of the determination result is also considered. In the configuration, upon reception of a response signal from the mobile terminal 1, the controlled device 2 calculates the reception strength of the radio wave transmitting the response signal. The controlled device 2 executes reception strength determination processing and determines whether the calculated reception strength is equal to or greater than a threshold value or is less than the threshold value (namely, determines whether the controlled device 2 is positioned inside or outside the authentication area). If the controlled device 2 determines that the calculated reception strength is equal to or greater than the threshold value, the controlled device adds area information indicating that the controlled device is positioned in the authentication area to an ACK signal; if the controlled device determines that the calculated reception strength is less than the threshold value, the controlled device adds area information indicating that the controlled device is positioned in the communication area to an ACK signal, and notifies the mobile terminal 1 of the ACK signal to which the area information is added. Then, the mobile terminal 1 receiving the ACK signal notifies the controlled device 2 of the use frequency selected in response to the area information by the next response signal. According to the configuration, the controlled device executes the reception strength determination processing, whereby the burden on the mobile terminal is lightened as the mobile terminal skips the processing. Lightening the burden becomes noticeable as the number of controlled devices is larger.

While the invention has been described in detail with reference to the specific embodiments, it will be obvious to those skilled in the art that various changes and modifications can be made without departing from the spirit and the scope of the invention.

INDUSTRIAL APPLICABILITY

The wireless communication unit, the mobile terminal, and the wireless authentication control method of the invention provide the advantage that to conduct wireless authentication with two or more controlled devices, interference of signal resend of one controlled device with reception of a signal transmitted from another controlled device can be suppressed, and the invention is useful in the fields of a wireless communication unit and a mobile terminal for conducting wireless communications with a controlled device to be wirelessly authenticated.

The invention claimed is:

1. A wireless communication unit, comprising:
    a short-range wireless transmission-reception section which transmits and receives a radio wave used for wireless communications; and
    a short-range wireless control section which controls wireless authentication processing with a controlled device,
    wherein the short-range wireless control section controls to perform the wireless authentication processing with the controlled device using a radio wave at a different frequency depending on whether wireless authentication in an initial authentication mode with the controlled device results in success or failure.

2. The wireless communication unit as claimed in claim 1, wherein the short-range wireless control section determines whether the wireless authentication in the initial authentication mode with the controlled device results in success or failure based on the reception strength of a radio wave received from the controlled device.

3. The wireless communication unit as claimed in claim 2, wherein the short-range wireless control section determines whether the wireless authentication in initial the authentication mode with the controlled device results in success or failure in response to whether or not the reception strength of the radio wave received from the controlled device is equal to or greater than a threshold value.

4. The wireless communication unit as claimed in claim 2, wherein the short-range wireless control section determines whether the wireless authentication in the initial authentication mode with the controlled device results in success or failure in response to whether or not the time period over which the reception strength of the radio wave received from the controlled device is equal to or greater than a threshold value, is equal to or greater than a predetermined time period.

5. The wireless communication unit as claimed in claim 1, wherein the short-range wireless control section determines whether the wireless authentication in the initial authentication mode with the controlled device results in success or failure based on a signal received from the controlled device for notifying the wireless communication unit of success or failure in wireless authentication with the wireless communication unit.

6. The wireless communication unit as claimed in claim 1, wherein if the wireless authentication in the initial authentication mode with the controlled device results in failure, the short-range wireless control section causes the short-range wireless transmission-reception section to transmit a signal for limiting the number of times the controlled device resends a signal to the wireless communication unit.

7. The wireless communication unit as claimed in claim 6, wherein if the wireless authentication in the initial authentication mode with a predetermined number of the controlled devices or more results in success, the short-range wireless control section causes the short-range wireless transmission-reception section to transmit a signal for limiting the number of times each controlled device resends a signal to the wireless communication unit.

8. A mobile terminal comprising the wireless communication unit as claimed in claim 1.

9. A wireless authentication control method of controlling wireless authentication processing with a controlled device by a wireless communication unit, the wireless authentication control method comprising the steps of:
   determining whether wireless authentication in an initial authentication mode with the controlled device results in success or failure;
   assigning different radio frequencies to the controlled device succeeding in the wireless authentication and to the controlled device failing the wireless authentication, respectively; and
   performing wireless authentication processing with the controlled device using a radio wave at the assigned radio frequency.

* * * * *